US010241689B1

(12) United States Patent
Sorenson, III

(10) Patent No.: US 10,241,689 B1
(45) Date of Patent: Mar. 26, 2019

(54) SURFACE-BASED LOGICAL STORAGE UNITS IN MULTI-PLATTER DISKS

(71) Applicant: Amazon Technologies, Inc., Seattle, WA (US)

(72) Inventor: James Christopher Sorenson, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/748,098

(22) Filed: Jun. 23, 2015

(51) Int. Cl.
*G06F 12/10* (2016.01)
*G06F 3/06* (2006.01)
*G06F 12/02* (2006.01)

(52) U.S. Cl.
CPC ............ *G06F 3/0616* (2013.01); *G06F 3/064* (2013.01); *G06F 3/0653* (2013.01); *G06F 3/0676* (2013.01); *G06F 12/0223* (2013.01); *G06F 2003/0692* (2013.01); *G06F 2212/1036* (2013.01); *G06F 2212/152* (2013.01); *G06F 2212/202* (2013.01); *G06F 2212/21* (2013.01); *G06F 2212/70* (2013.01)

(58) Field of Classification Search
CPC ... G06F 3/0616; G06F 3/0676; G06F 12/0223
USPC .......................................................... 711/4
See application file for complete search history.

(56) References Cited

U.S. PATENT DOCUMENTS

| 5,539,697 | A | * | 7/1996 | Kim ..................... G11C 29/88 365/200 |
| 5,664,187 | A | | 9/1997 | Burkes et al. |
| 6,502,178 | B1 | * | 12/2002 | Olbrich ................... G06F 3/061 711/112 |
| 7,783,600 | B1 | | 8/2010 | Spertus et al. |
| 8,051,205 | B2 | | 11/2011 | Roy et al. |
| 8,364,716 | B2 | | 1/2013 | Gaonkar et al. |
| 8,433,869 | B1 | | 4/2013 | Natanzon et al. |
| 8,463,820 | B2 | | 6/2013 | Chhugani et al. |
| 8,538,029 | B2 | | 9/2013 | Li et al. |
| 2011/0060887 | A1 | | 3/2011 | Thatcher et al. |
| 2011/0078116 | A1 | | 3/2011 | Zhang et al. |

(Continued)

FOREIGN PATENT DOCUMENTS

| CN | 1472963 | 2/2004 |
| CN | 101145933 | 3/2008 |

(Continued)

OTHER PUBLICATIONS

Foreign Communication From a Counterpart Application, PCT Application No. PCT/CN2013/080990, English Translation of Chinese Search Report, dated Aug. 14, 2015, 2 pages.

(Continued)

*Primary Examiner* — Jae U Yu
(74) *Attorney, Agent, or Firm* — Davis Wright Tremaine LLP

(57) ABSTRACT

Techniques for treating surfaces of a multi-platter disk as independent units are described herein. Each surface of a plurality of surfaces of a multi-platter disk is identified and a set of storage layout data describing the storage format of the surface is received. A logical address is calculated based on the surface layout data and at least a portion of the storage layout data is stored on the surface. The logical address of the surface is then provided for use by other services.

20 Claims, 10 Drawing Sheets

(56) References Cited

U.S. PATENT DOCUMENTS

| | | |
|---|---|---|
| 2012/0290868 A1 | 11/2012 | Gladwin et al. |
| 2012/0290877 A1 | 11/2012 | Grube et al. |
| 2012/0290878 A1 | 11/2012 | Gladwin et al. |
| 2013/0036289 A1 | 2/2013 | Welnicki et al. |
| 2014/0229696 A1 | 8/2014 | Feng et al. |
| 2014/0229697 A1 | 8/2014 | Feng et al. |

FOREIGN PATENT DOCUMENTS

| | | |
|---|---|---|
| CN | 101175011 | 5/2008 |
| CN | 101834897 | 9/2010 |
| CN | 101834899 | 9/2010 |
| CN | 102279777 | 12/2011 |
| CN | 102598019 | 7/2012 |
| CN | 102624866 | 8/2012 |

OTHER PUBLICATIONS

Foreign Communication From a Counterpart Application, PCT Application No. PCT/CN2013/080990, English Translation of Chinese Written Opinion, dated Aug. 8, 2015, 10 pages.

\* cited by examiner

SURFACE-BASED LOGICAL STORAGE UNITS IN MULTI-PLATTER DISKS

BACKGROUND

Modern computer systems store large amounts of data using a variety of storage systems. In a modern distributed computer system environment, where a plurality of users, services, applications, virtual machines, and hosts have access to computer systems, data associated with such entities can be frequently accessed. Such data may be read, written, replicated, copied, and deleted on a near-constant basis, placing a tremendous workload on storage system devices. In such systems, the failure of storage system devices may occur very frequently, thus increasing the burden on storage systems due to a requirement to restore data that may be lost when storage system devices fail.

Replicating data across multiple devices may make the system more tolerant of storage system device failure, but such replication increases storage requirements. Additionally, while a storage system device may only partially fail, the logical addressing schemes used for such storage system devices may not be configured to compensate for a partial failure. For the sake of efficiency, the entire storage system device may be marked as unusable and discarded. Detecting storage system device failures and addressing them may then become increasingly costly, reducing the overall efficiency of the storage system and increasing the cost to customers or users of a computer system.

BRIEF DESCRIPTION OF THE DRAWINGS

Various embodiments in accordance with the present disclosure will be described with reference to the drawings, in which.

DETAILED DESCRIPTION

Figure 1:
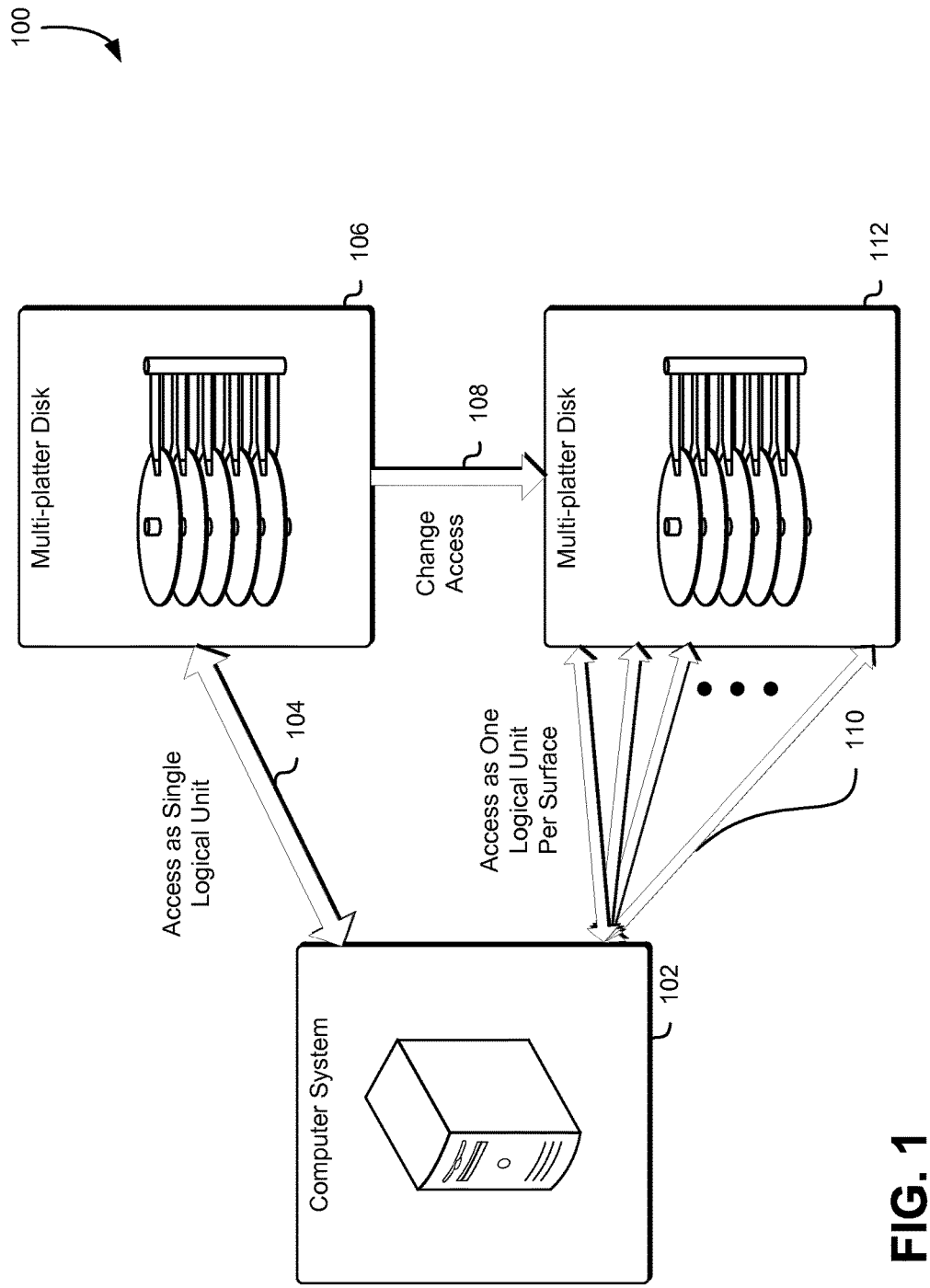
FIG. 1 illustrates an example environment where each surface of a multi-platter disk may be treated as an independent unit.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, processes, and methods to treat each surface of a set of surfaces and/or each subset of a plurality of subsets of a set of surfaces of a multi-platter storage system device as a single unit such that other devices are able to reference the surface as a separate unit. A storage system device such as a hard disk drive may be manufactured with a plurality of platters, each of which may have a first (e.g., "top") surface and a second (e.g., "bottom") surface. Such hard disk drives with a plurality of platters may be referred to herein as "multi-platter disks."

A multi-platter disk may be configured to store data on the platter surfaces in microscopic magnetic regions. A multi-platter disk may typically be treated as a single unit such that the storage capacity of the surfaces is aggregated and made available to a computer system as a single unit of storage capacity. As an example, a multi-platter disk may have ten surfaces on five platters, each of which is capable of storing 500 GB (gigabytes or $10^9$ bytes) of data. Such a multi-platter disk may be made available to a computer system as a 5 TB (terabytes or $10^{12}$) disk drive. As may be contemplated, the number of surfaces of a multi-platter disk and the storage capacity of those surfaces described herein are merely illustrative examples and other numbers of surfaces and storage capacities may be considered as within the scope of the present disclosure.

Such multi-platter disks may have each surface treated as an independent unit so that, for example, rather than making the 5 TB disk drive described above available as a single 5 TB drive, the drive may be made available as ten logical drives, each of 500 GB. Such multi-platter disks may also have each subset of a plurality of subsets of a set of surfaces treated as an independent unit so that, for example, rather than making the 5 TB disk drive described above available as a single 5 TB drive or making the drive available as ten logical drives, each of 500 GB, the drive may be made available as five logical drives, each of 2 GB (each including two surfaces), as four logical drives, each of 2.5 GB (each including three surfaces), or as a number of different sized logical drives (each including different numbers of surfaces).

By treating each surface of a multi-platter disk as an independent unit, the number of drive failures is reduced, thus reducing the cost of providing such storage. Modern multi-platter disks are very complex and such disks may not be easily repaired. When a multi-platter disk is treated as a single unit, if one surface, one read/write head or a portion of a surface fails, the multi-platter disk is typically discarded. However, if each surface of the multi-platter disk is treated as an independent unit, the multi-platter disk may continue functioning if only a portion of the surfaces have failed, but the rest are still operational. The multi-platter disk may be functioning with a reduced storage capacity, but that multi-platter disk may still be usable.

In the example of the above-described multi-platter disk with ten 500 GB surfaces, each of which is treated as an independent unit, one of the surfaces may experience a surface failure, but the other nine surfaces may still be functioning and may still be made available for use by the applications, services, or processes that may be using them for storage. In the event that a second surface of the remaining nine surfaces fails, the other eight surfaces may also still be made available for use by the applications, services, or processes that may be using them for storage. If a count of the number of surfaces that have failed exceeds a threshold number, the entire multi-platter disk may be marked as failed, and the multi-platter disk may then be discarded and replaced with another. The threshold number may be determined by the system, or determined by a hardware manufacturer, or determined by the owner of the system. The threshold number may be calculated based on previous performance characteristics of the same (or similar hardware). The threshold number may also be experimentally determined by, for example, performing one or more tests or experiments on the multi-platter disk. In an example, the threshold number of surfaces may be based on a percentage of the total number of usable surfaces. In such an example, a multi-platter disk where more than 30 percent of the surfaces have failed may be discarded and replaced with another.

FIG. 1 illustrates an example environment 100 where each surface of a multi-platter disk may be treated as an independent unit in accordance with at least one embodiment. Note that the techniques described and suggested herein may apply to single surfaces as well as to sets of surfaces and, as such, techniques referring to "each surface" may be understood to apply to subsets of a set of surfaces of a multi-platter disk where such subsets may include one or more surfaces that may be treated together as an independent unit. For example, a multi-platter disk may have five platters, each of which may have two surfaces. Subsets of the set of ten surfaces may include one surface, two surfaces, three surfaces, and so on. Techniques described and suggested herein may apply to single surfaces and/or to a plurality of surfaces that may be treated as an independent unit.

A computer system 102 may have access to one or more data storage devices that may be used to store and retrieve data associated with the computer system 102. The computer system 102 may have one or more processes, applications, services, or modules running thereon and each of these processes, applications, services, or modules may require access to one or more types of data storage. For example, a database application may be operating on the computer system 102 and the database application may require access to data storage to store the database schema as well as the data associated with the database. Most processes, applications, services, or modules running on a computer system require some access to some means of data storage.

A computer system may provide access to storage, which may be a physically attached block storage device, may be a network attached storage device, may be virtual storage, or may be some other type of storage. The storage may be directly accessible to a user of the computer system (e.g., the one or more hard drives of a personal computer system), or may be abstracted by the computer system operating system (e.g., the storage on a mobile device such as a smart phone). The storage may also be abstracted such that, for example, a collection of storage devices may be managed by a storage service as described below. Such storage may be accessed by a client or user using, for example, one or more application programming interface requests that may be used to determine the details about how the data is stored (i.e., the physical location of the block storage device used to store the data) may be hidden from the client.

In the example illustrated in FIG. 1, a computer system 102 may have access 104 to a multi-platter disk 106 and may access 104 the multi-platter disk as a single logical unit. A multi-platter disk 106 is a block storage device (e.g., a hard disk drive) with one or more platters, each of which has two surfaces (e.g., a top surface and a bottom surface) as described herein. It should be noted that while the terms "top" surface and "bottom" surface are used herein, these terms may be understood to refer to a first surface and a second surface depending on the orientation of the multi-platter disk. For example, a multi-disk drive may be oriented so that the platters are vertical. In such an example, the first surface (referred to herein as a "top" surface) may be left-most, or may be right-most depending on the orientation of the multi-platter disk.

As used herein, the term "platter" may refer to a physical medium, typically disk shaped, upon which data may be stored using a magnetic medium. Data may be stored on the platter by changing one or more magnetic characteristics of portions of the medium. A multi-platter disk may include a disk with a single platter where such a disk has two usable surfaces (i.e., a top surface and a bottom surface). Also as used herein, a "usable surface" of a platter is a platter upon which data may be stored as described herein. For example, in a hard disk drive, the top surface of the top platter and/or the bottom surface of the bottom platter may not be usable surfaces because there may be no read/write heads for these surfaces due to geometry constraints. In such an example, the top surface of the top platter and the bottom surface of the bottom platter may not be usable surfaces.

Data may be retrieved from the surface (e.g., may be read from the surface) and/or may be stored on the surface (e.g., may be written to the surface) as a result of an access request (which may also be referred to herein as an "input-output (I/O) request"). An access request may specify a logical unit number or other logical address that may correspond to one or more surfaces associated with the access request. The access request (or input-output request) may be fulfilled by the multi-platter disk by providing access to the surface or surfaces corresponding to the logical unit number or other logical address of the access request for reading and/or writing data to the corresponding surface or surfaces.

An access request to read and/or write data to the surface (or surfaces) may be received by the multi-platter disk. Based on the logical address associated with the access request, the data may be retrieved (or read) from the surface or surfaces and/or may be stored on (or written to) the surface or surfaces that correspond to the logical address specified by the access request. Similarly, an access request to read data from the surface may be received by the multi-platter disk and such an access request may also have a logical unit number or other logical address associated with the access request. The data may then be read from the surface corresponding to the surface or surfaces corresponding to the logical address associated with the access request. A logical unit address may, for example, be a logical unit number of a small computer system interface protocol. The access request may be based on a user-specified logical address protocol or user-defined logical address protocol that may be based on, for example, the surface number, the platter number, the disk number, or some other criteria.

A user-specified logical address protocol (or user-defined logical address protocol) is a custom protocol that may be used to determine the surface or surfaces associated with an access request. For example, a multi-platter disk may have six surfaces and a user may first specify (using, for example, a user interface or an application programming interface request) that surface one may correspond to a first logical address, that surfaces two and three may correspond to a second logical address, and that surfaces four, five, and six correspond to a third logical address. Such a user-specified logical address protocol allows for access requests using any of the three logical addresses and, by using the correct logical address, each of the sets of surfaces may be treated as an independent unit. The user may select a different user-specified logical address protocol (or user-defined logical address protocol) that may, for example, treat each platter (or each surface) as an independent unit using a user interface and/or an application programming interface request.

Using the techniques described herein, access to the multi-platter disk 106 may be changed 108 so that each surface of the multi-platter disk 112 may be accessed 110 by the computer system 102 as one logical unit per surface. In an example, a multi-platter disk may have five platters and each platter may have two surfaces. Prior to having access to the multi-platter disk changed, the computer system 102 may access the multi-platter disk as a single logical unit. For example, in a personal computer operating system, this single logical unit may be accessed as a single hard disk drive (for example, "/dev/sba1" on a UNIX® operating system or drive "C:" on a Windows® operating system in embodiments where the hard disk drive has a single partition). After having access to the multi-platter disk changed, the computer system 102 may have access to the multi-platter disk as ten logical units. In the example of the personal computer operating system, the ten logical units may be accessed as "/dev/sba1" to "/dev/sba10" on a UNIX® operating system or drives "C:" to "L:" on a Windows® operating system.

Figure 2:
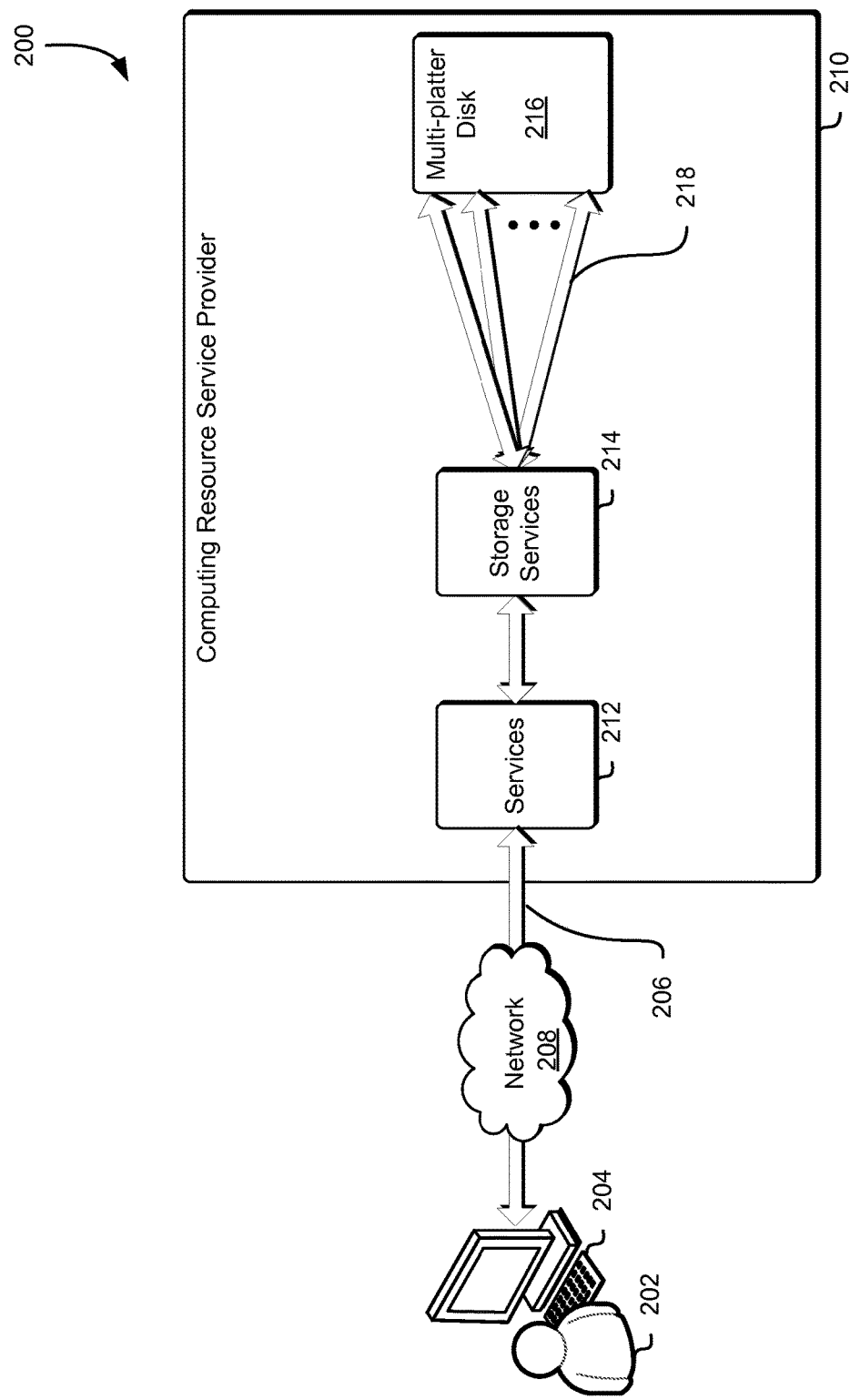
FIG. 2 illustrates an example environment where users and services may access storage services associated with one or more multi-platter disks where each surface of the multi-platter disk may be treated as an independent unit.

FIG. 2 illustrates an example environment 200 where users and services may access storage services associated with one or more multi-platter disks where each surface of the multi-platter disk may be treated as an independent unit as described in connection with FIG. 1 and in accordance with at least one embodiment. A user 202 may connect 206 to one or more services 212 through a computer system client device 204. The services 212 may be provided by a computing resource service provider 210. In some embodiments, the computing resource service provider 210 may provide a distributed, virtualized and/or datacenter environment within which one or more applications, processes, services, virtual machines, and/or other such computer system entities may be executed. In some embodiments, the user 202 may be a person, or may be a process running on one or more remote computer systems, or may be some other computer system entity, user, or process.

The command or commands to connect to the computer system instance may originate from an outside computer system and/or server, or may originate from an entity, user or process on a remote network location, or may originate from an entity, user or process within the computing resource service provider, or may originate from a user of the computer system client device 204, or may originate as a result of an automatic process or may originate as a result of a combination of these and/or other such origin entities. In some embodiments, the command or commands to initiate the connection 206 to the computing resource service provider 210 may be sent to the services 212, without the intervention of the user 202. The command or commands to initiate the connection 206 to the services 212 may originate from the same origin as the command or commands to connect to the computing resource service provider 210 or may originate from another computer system and/or server, or may originate from a different entity, user, or process on the same or a different remote network location, or may originate from a different entity, user, or process within the computing resource service provider, or may originate from a different user of a computer system client device 204, or may originate as a result of a combination of these and/or other such same and/or different entities.

The user 202 may request connection to the computing resource service provider 210 via one or more connections 206 and, in some embodiments, via one or more networks 208 and/or entities associated therewith, such as servers connected to the network, either directly or indirectly. The computer system client device 204 that may request access to the services 212 may include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. The network may include, for example, a local network, an internal network, a public network such as the Internet, or other networks such as those listed or described below. The network may also operate in accordance with various protocols such as those listed or described below.

The computing resource service provider 210 may provide access to one or more host machines as well as provide access to services such as virtual machine (VM) instances, automatic scaling groups, or file-based database storage systems as may be operating thereon. The services 212 may connect to or otherwise be associated with one or more storage services 214. The storage services 214 may be configured to provide data storage for the services 212. In an embodiment, the computing resource service provider 210 may provide direct access to the one or more storage services 214 for use by users and/or customers of the computing resource service provider. The storage services may manage storage of data on one or more block storage devices, which may include one or more multi-platter disks 216 where each surface may be treated as an independent unit as described herein.

The storage services 214 may include one or more services such as block storage services, redundant data storage services, on-demand data storage services, archival storage services, data warehousing services, user access management services, content management services, or other such computer system services as may be running thereon. The computing resource service provider 210 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments. In some embodiments, the host machines may be physical machines located within the computer system environment. In some embodiments, the host machines may be guest virtual machines operating on physical machines located within the computer system environment.

In an example, the storage services 214 may include on-demand storage services. On-demand data storage services may be a collection of computing resources configured to synchronously process requests to store and/or access data. An on-demand data storage service may operate using computing resources (e.g., databases) that enable the on-demand data storage service to locate and retrieve data quickly, to allow data to be provided in response to requests for the data. For example, an on-demand data storage service may maintain stored data in a manner such that, when a request for a data object is retrieved, the data object can be provided (or streaming of the data object can be initiated) in a response to the request. As noted, data stored in an on-demand data storage service may be organized into data objects. The data objects may have arbitrary sizes except, perhaps, for certain constraints on size. Thus, an on-demand data storage service may store numerous data objects of varying sizes. The on-demand data storage services may operate as a key value store that associates data objects with identifiers of the data objects that may be used by the customer to retrieve or perform other operations in connection with the data objects stored by the on-demand data storage service.

In another example, the storage services 214 may include archival storage services. Archival storage services may comprise a collection of computing resources that collectively operate to provide storage for data archiving and backup of data. The data may comprise one or more data files that may be combined to form an archive. An archival storage service may be configured to persistently store data that may be infrequently accessed and for which long retrieval times are acceptable to a user of the archival storage service. A user may interact with the archival storage service (for example, through appropriately configured application programming interface requests made to the archival storage service) to generate one or more archives, upload and retrieve the one or more archives or monitor the generation, upload or retrieval of the one or more archives. As may be contemplated, the storage services described herein are merely illustrative examples and other types of storage services may be considered as within the scope of the present disclosure.

Figure 3:
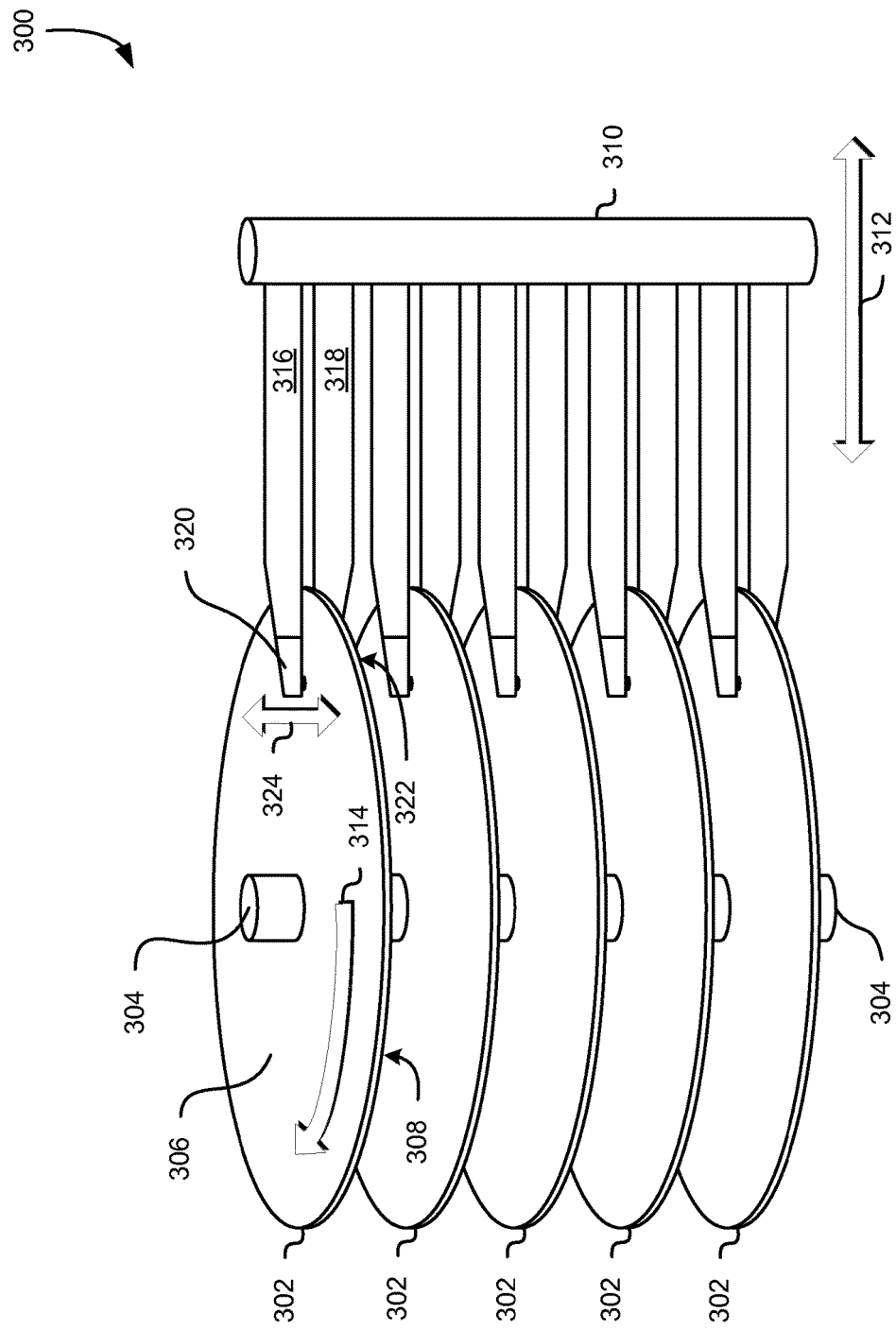
FIG. 3 illustrates an example diagram of a multi-platter disk.

FIG. 3 illustrates an example diagram 300 of a multi-platter disk where each surface may be treated as an independent unit as described in connection with FIG. 1 and in accordance with at least one embodiment. The multi-platter disk in example diagram 300 has five of platter 302, each of which is attached to a central spindle 304. In the example illustrated, the central spindle 304 and the attached platters spin or rotate 314 in a clockwise direction as viewed from above. In some embodiments, the attached platters may spin or rotate 314 in an anticlockwise direction and/or may spin or rotate 314 in both directions. In the example illustrated, the five platters rotate together with the central spindle 304 (i.e., they do not spin or rotate separately from each other). Such platters may be mechanically linked to each other and/or to the central spindle 304. In an embodiment, the platters may spin or rotate separately from each other. Each platter 302 has a top surface 306 and a bottom surface 308 where data may be read and written using, for example, magnetic regions on the surface.

Data may be read from and/or written to the top surface 306 using a first magnetic read/write head 320, which is attached to an arm 316. The arm 316 is, in turn, attached to an assembly 310, which may move 312 in a direction to allow access to areas of the top surface 306 as the platter spins or rotates. Data may be read from and/or written to the bottom surface 308 using a second magnetic read/write head 322, which is attached to an arm 318. The arm 318 is also attached to the assembly 310, which may move 312 in a direction to allow access to areas of the bottom surface 308 as the platter spins or rotates.

Each of the platters may have an arm and a read/write head for the top surface of the platter and also may have an arm and a read/write head for the bottom surface of the platter. In the example illustrated in FIG. 3, all of the arms associated with the top surfaces and all of the arms associated with the bottom surfaces move together as a unit (i.e., they do not move separately from each other). In an embodiment, the arms may move separately from each other. In the example illustrated in FIG. 3, the read/write heads may move separately from each other. That is, small movements may be made by the read/write heads to adjust for variations in data locations, to seek ahead, to look on adjacent tracks, or for other reasons. As used herein, a "track" is a circular region of the surface (i.e., a region that forms a complete circle) where one or more contiguous streams of data may be stored. Hard disk tracks are concentric rather than continuous. A hard disk drive may have a plurality of physical tracks and each of the physical tracks may have one or more logical tracks. So for example, a hard disk drive with a thousand physical tracks where each of the physical tracks has four logical tracks may have four-thousand tracks. A read/write head 320 may also move up and down 324 relative to the top surface 306. This movement is provided so that the read/write head may be kept clear of the surface when not actively reading and writing. A read/write head striking the surface is a leading cause of hard disk failure. A hard disk may be configured provide a notification of failure to a controller, operating system, system monitor, or a combination of these and/or other devices, systems, or services.

Figure 4:
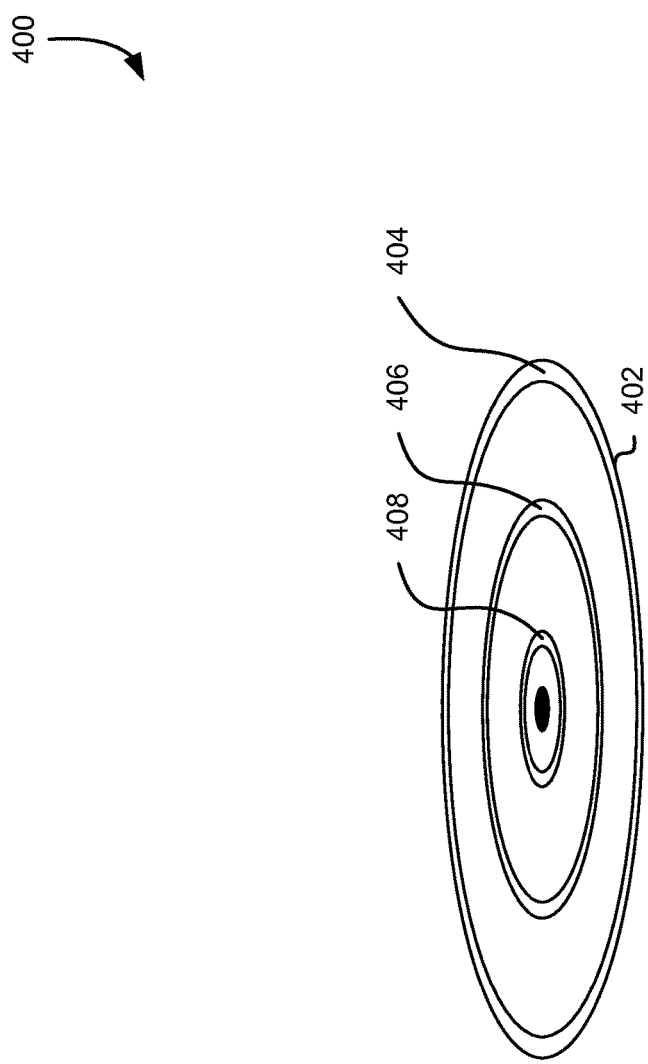
FIG. 4 illustrates an example diagram of the track layout of a surface of a single platter of a multi-platter disk.

FIG. 4 illustrates an example diagram 400 illustrating the track layout of a surface of a single platter of a multi-platter disk as described in connection with FIG. 1 and in accordance with at least one embodiment. In the example illustrated in FIG. 4, three track regions are shown on a surface 402 of a platter of a multi-platter disk. The first track region 404 is near the outside of the surface 402. The second track region 406 is near the middle of the surface 402. The third track region 408 is near the inside of the surface 402. If the platter is rotating at a fixed velocity (e.g., 12,000 rotations per minute or 200 rotations per second), a point on the surface within the first track region 404 may be moving faster (i.e., relative to the read/write head) than a point on the surface within the second track region 406, which may be moving faster than a point on the surface within the third track region. A track region where points on the surface are moving faster with respect to a read/write head may allow the writing of more data in that track region for each unit time where the density of the magnetic areas on the surface are fixed, or may allow the writing of less-densely packed data in that track region where the data per unit time is fixed and the density of the magnetic areas on the surface is variable. A hard disk drive typically is formatted with the density of the magnetic regions relatively constant, so that data may be read from and/or written to tracks in the outer regions of the surface at a higher rate than data may be read from and/or written to tracks in the inner regions of the surface.

Figure 5:
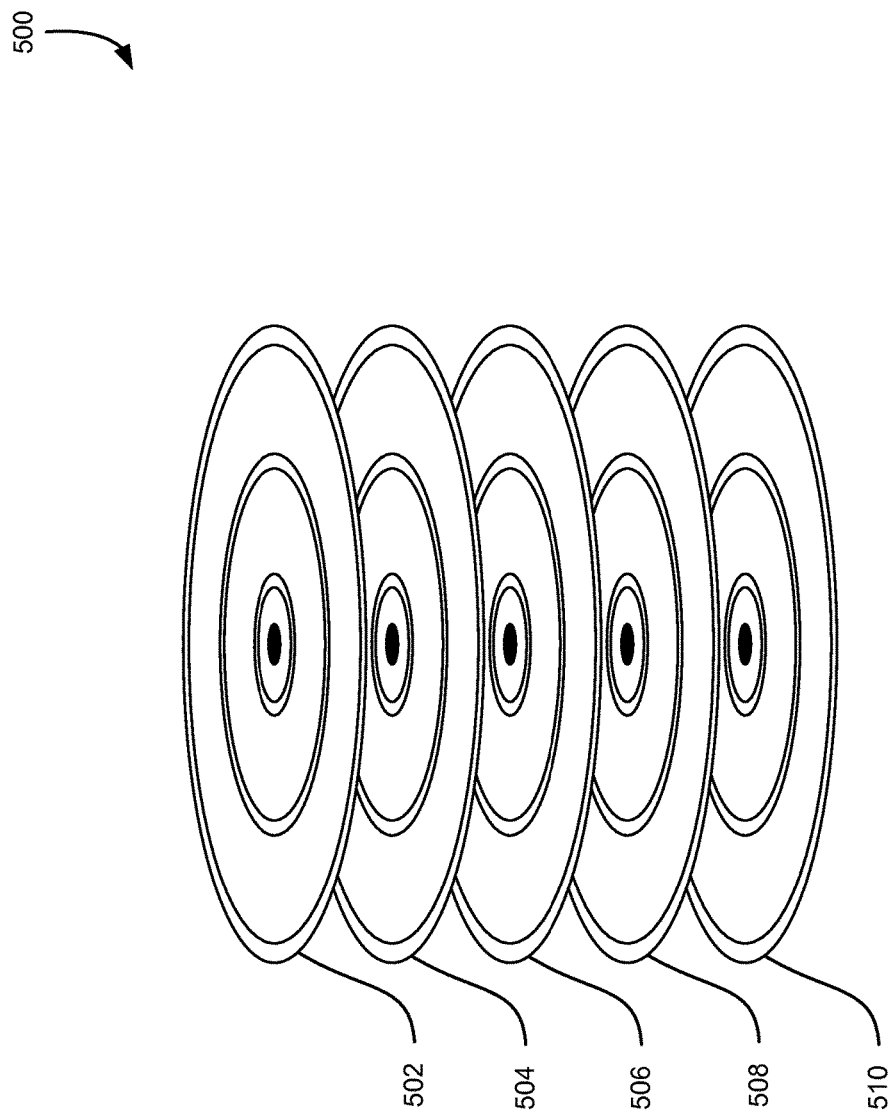
FIG. 5 illustrates an example diagram of the track layout of a multi-platter disk.

FIG. 5 illustrates an example diagram 500 of the track layout of surfaces of multiple platters of a multi-platter disk as described in connection with FIG. 1 and in accordance with at least one embodiment. Just as in the example illustrated in FIG. 4, each of the surfaces illustrated in FIG. 5 has three track regions that may rotate at different speeds and thus may provide for writing data at higher rates in the outer regions of the surface. In an embodiment of a multi-platter disk treated as a single unit, data that is part of a single transaction or that is associated with a single application may be stored in similar track regions on multiple surfaces to ensure predictable performance for reads and/or writes.

For example, a request to write a file that would require writes on sixteen different tracks may first write to a track near the outer region of the top surface of the first platter 502, then may write to a track near the outer region of the bottom surface of the platter 502, then may write to a track near the outer region of the top surface of the platter 504 and so on. After tracks have been written to each of the surfaces, the remaining tracks may then start again at the top surface of the first platter 502.

In an embodiment, more frequently accessed data may be stored in the outer tracks of the surfaces of the platters as such data may be read from and/or written to the disk more rapidly. In another embodiment, more frequently accessed data may be stored in the middle tracks of the surfaces of the platters to minimize the seek time (e.g., the time it takes the read/write head to reach the track). As may be contemplated, the different orders that tracks may be stored on surfaces described herein are merely illustrative examples and other methods for determining the order that tracks may be written to a surface may be considered as within the scope of the present disclosure. Data may be stored differently on the surfaces when each surface of a multi-platter disk is treated as an independent unit. For example, data associated with a single application may not be stored in similar track regions on multiple surfaces to ensure predictable performance for reads and/or writes and may instead be stored in similar track regions on the single surface to the extent that such storage is possible.

Figure 6:
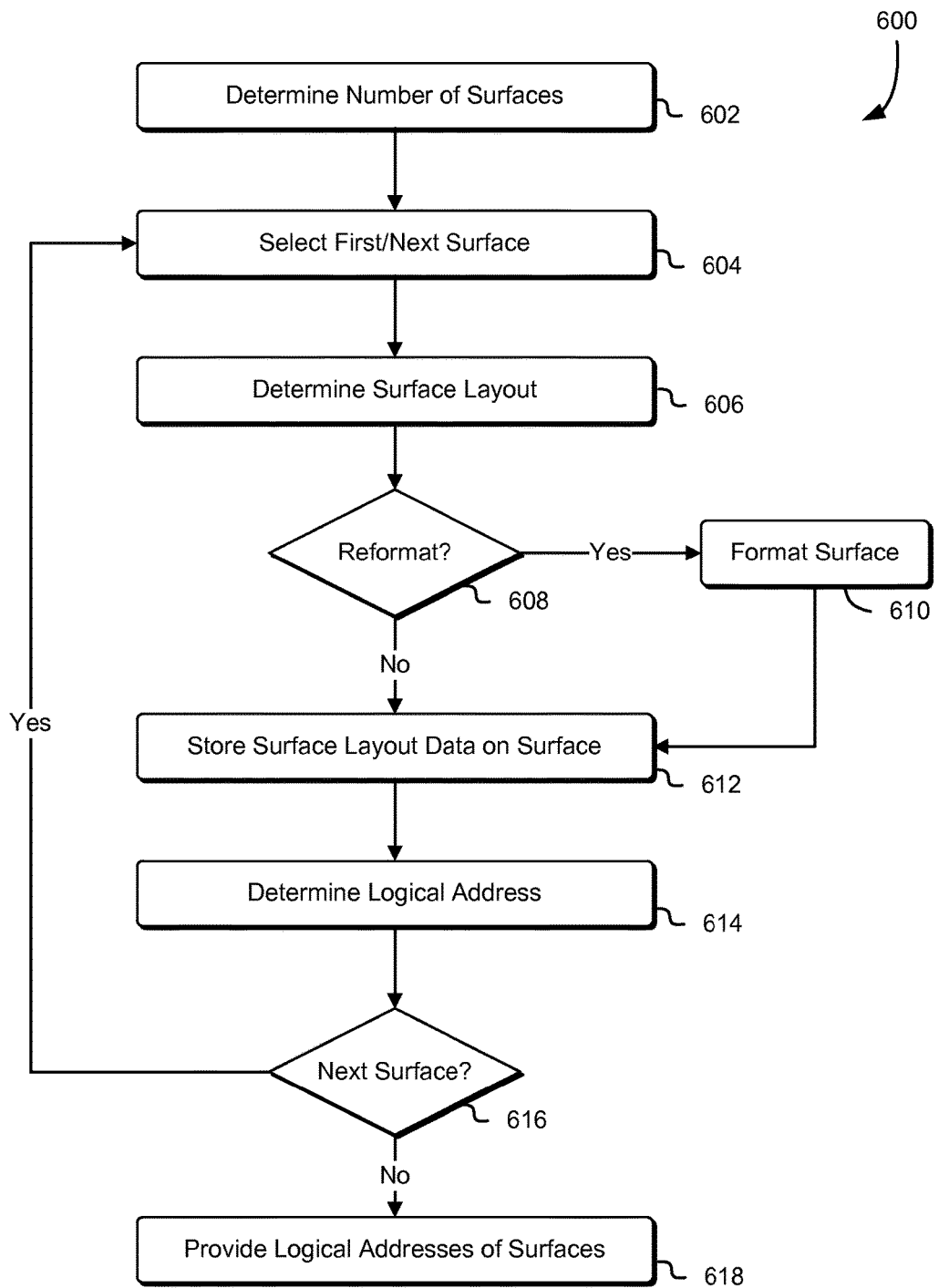
FIG. 6 illustrates an example process for addressing surfaces of a multi-platter disk where each surface of the multi-platter disk is treated as an independent unit.

FIG. 6 illustrates an example process 600 for addressing surfaces of a multi-platter disk where each surface of the multi-platter disk is treated as an independent unit as described in connection with FIG. 1 and in accordance with at least one embodiment. A storage service such as the storage service 214 described in connection with FIG. 2 may perform at least a portion of the process illustrated in FIG. 6. Software and/or firmware running on the multi-platter disk such as the multi-platter disk 216 described in connection with FIG. 2 may also perform at least a portion of the process illustrated in FIG. 6.

First, the number of surfaces of the multi-platter disk may be determined 602. The number of surfaces of the multi-platter disk may be determined by querying software and/or firmware running on the multi-platter disk, or from information obtained from the manufacturer of the multi-platter disk, or from an operating system of a computing system associated with a storage service, or from the storage service, or by experimentation, or by some other means. For example, a storage service may determine the number of surfaces of a multi-platter disk by attempting to write to and/or read from different surfaces of the multi-platter disk. There may be a top surface and a bottom surface for each platter. In some embodiments, each top surface and each bottom surface may be usable surfaces. In some embodiments, the top surface of the top platter and/or the bottom surface of the bottom platter may not be usable surfaces due to space constraints for the read/write head as described above.

Next, the first surface may be selected 604 and, for the selected surface, the surface layout (also referred to herein as "surface layout data" and/or "surface metadata") may be determined in step 606. The surface layout may include the number and location of the tracks of the surface, the arrangement of the logical blocks of the surface, the logical unit number associated with the surface, the density of the magnetic regions, the total storage available for the surface, the storage format (i.e., how the drive may be formatted for use), or other layout information. For example, the arrangement of the logical blocks of the surface may be based on a logical block addressing (LBA) scheme that may include a set of logical block addresses. The set of logical block addresses may be used to locate logical blocks that may, in turn, correspond to physical blocks on the surface. The surface layout may also include address information for the tracks, sectors, blocks, or other regions of the surface. The surface layout may also include location information for bad blocks of the surface (i.e., areas of the disk where data may not be reliably stored, also referred to herein as "unusable blocks" or "unusable logical blocks"). The surface layout may also include other data and/or metadata associated with the surface. The surface layout may be obtained by querying software and/or firmware running on the multi-platter disk, or from information obtained from the manufacturer of the multi-platter disk, or from an operating system of a computing system associated with a storage service, or from the storage service, or by experimentation, or by some other means as described above.

In some embodiments, it may next be determined whether the surface should be reformatted 608 prior to further processing of the surface. It may be determined that a surface should be reformatted 608 prior to further processing if, for example, the existing surface formatting is incompatible with treating each surface of a multi-platter disk as an independent unit. Multi-platter disks may be formatted to optimize their use as a single logical unit (e.g., using track layouts such as those described in connection with FIG. 5). Converting multi-platter disks for use such that each surface of the multi-platter disk is treated as an independent unit may require a different formatting of the surface to optimize the performance. If it is determined that the surface should be reformatted 608 prior to further processing of the surface, the surface may be formatted 610 by, for example, issuing a command from an operating system of a computing system associated with a storage service or from the storage service. In an embodiment, the entire disk (and thus, each surface) may be formatted or reformatted prior to commencing the process 600 illustrated in FIG. 6.

Once the surface has been prepared, at least a portion of the surface layout data may be stored on the surface 612 as described below in connection with FIG. 7. In some embodiments, the surface layout data may be stored on the surface 612 as part of formatting or reformatting the surface. In such embodiments, additional surface layout data may be stored on the surface after the formatting or reformatting. As described above, the surface layout data may include the number and location of the tracks of the surface, the density of the magnetic regions, the total storage available for the surface, address information for the tracks, sectors, blocks, or other regions of the surface, locations of bad blocks associated with the surface, or other data and/or metadata associated with the surface.

Finally, a logical address (or logical unit number, also referred to herein as a "LUN") may be determined for the surface in step 614 so that the surface may be treated as an independent unit. In the example above with a multi-platter disk with ten surfaces, ten logical unit numbers may be provided so that the ten surfaces may be accessed as "/dev/sba1" to "/dev/sba10" on a UNIX® operating system or drives "C:" to "L:" on a Windows® operating system. In such an example, the ten logical unit numbers may also be used as ten separate hard disk drives on ten separate systems, or distributed over a plurality of systems.

The process from step 606 to step 614 of the process 600 may then be repeated for any next surfaces 616 and, after each surface has been analyzed, formatted, had surface layout data stored on it, and had a logical address determined, the collection of logical addresses for the surfaces may be provided 618 so that the surfaces may be used by the storage service as independent units.

Figure 7:
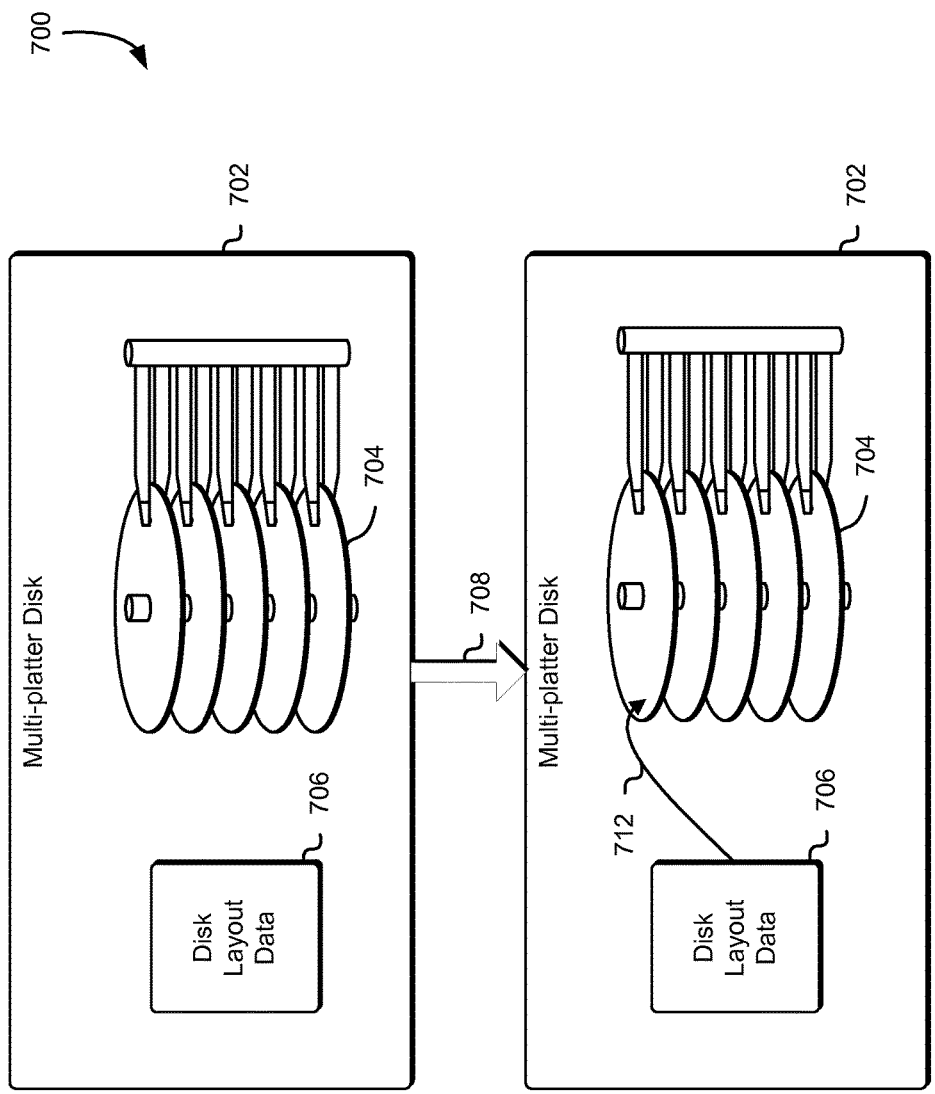
FIG. 7 illustrates an example environment where disk layout data of a multi-platter disk is migrated to separate surfaces.

FIG. 7 illustrates an example environment 700 where disk layout data of a multi-platter disk is migrated to separate surfaces as described in connection with FIG. 6 and in accordance with at least one embodiment. In the example illustrated in FIG. 7, disk layout data 706 associated with the surfaces 704 of a multi-platter disk 702 may be stored in firmware or memory of the multi-platter disk 702, may be stored on one or more surfaces 704 of the multi-platter disk 702, may be stored external to the multi-platter disk 702, or may be stored in a combination of these and/or other such locations. For example, the number of platters of a multi-platter disk 702 may be provided by a manufacturer or may be determined by querying the multi-platter disk 702, the track layout information may be stored in firmware on the multi-platter disk 702, the bad block information may be stored on one or more of the surfaces of the multi-platter disk 702, and other disk layout data about the multi-platter disk 702 may be stored in, for example, a database maintained by a computing resource service provider.

When the multi-platter disk 702 is converted 708 to treat each surface as an independent unit, some or all of the disk layout data 706 may be stored on each of the surfaces. In the example illustrated in FIG. 7, some or all of the disk layout data 712 associated with the top surface of the top platter is stored on that surface so that disk layout data for that surface can be accessed by an application, process, service, or module with access to that surface. Some or all of the disk layout data 712 associated with the top surface of the top platter may be stored on the top surface of the top platter because, for example, an application that is configured to use that surface to store data may not have access to the disk layout data 706 and/or may not have access to the disk layout data that may be stored on other surfaces of the multi-platter disk 702.

Figure 8:
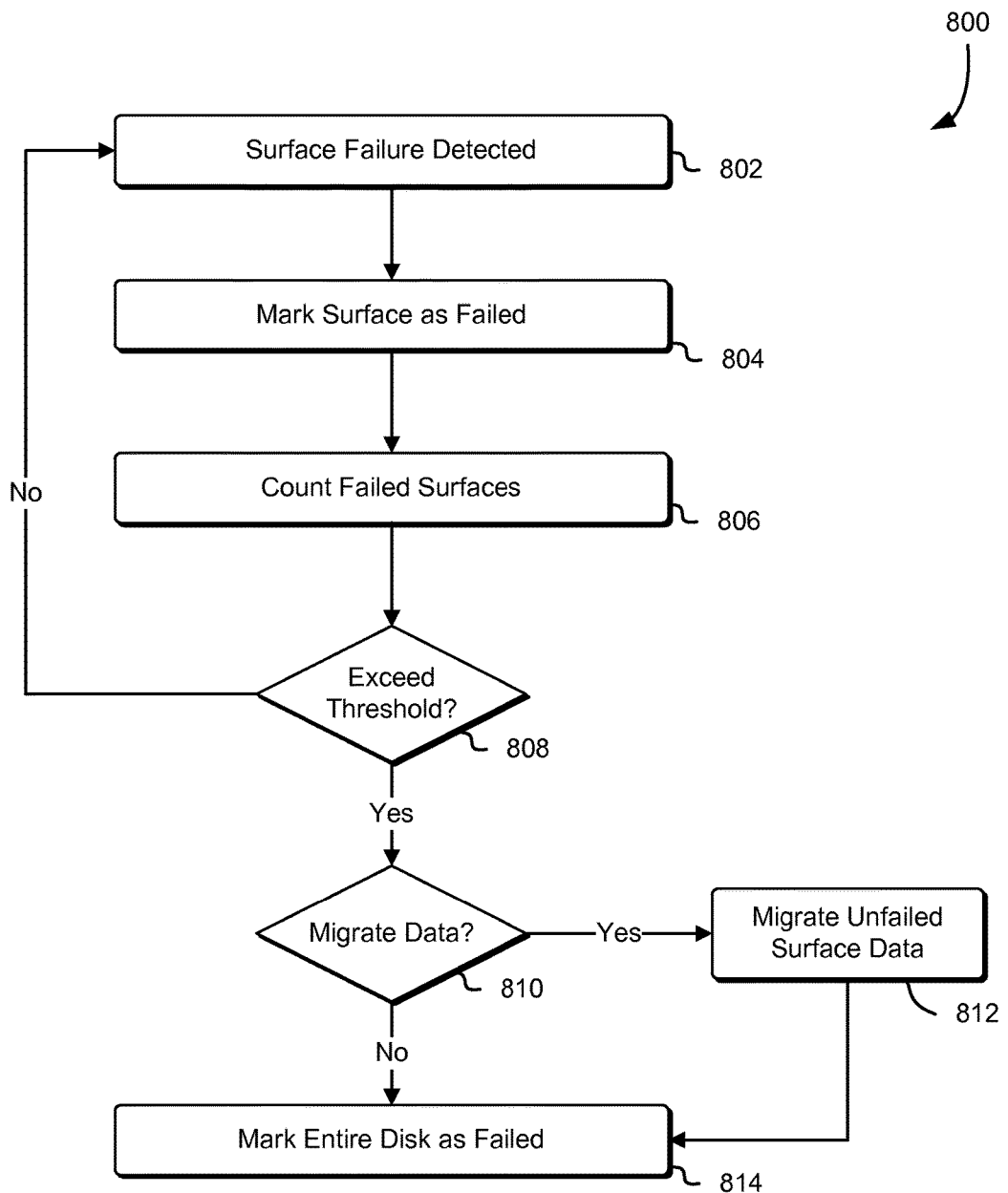
FIG. 8 illustrates an example process for processing surface failures that occur on a multi-platter disk where each surface of the multi-platter disk is treated as an independent unit.

FIG. 8 illustrates an example process 800 for processing surface failures that may occur on a multi-platter disk where each surface of the multi-platter disk is treated as an independent unit as described in connection with FIG. 1 and in accordance with at least one embodiment. A storage service such as the storage service 214 described in connection with FIG. 2 may perform at least a portion of the process illustrated in FIG. 8. Software and/or firmware running on the multi-platter disk such as the multi-platter disk 216 described in connection with FIG. 2 may also perform at least a portion of the process illustrated in FIG. 8. An operating system of a computer system associated with the multi-platter disk such as the computer system 102 described in connection with FIG. 1 may also perform at least a portion of the process illustrated in FIG. 1.

When a surface failure is detected 802, the surface may be marked as failed 804. When a surface fails, one or more operations may be performed as a result of the surface failure including, but not limited to, performing one or more operations to recover and/or replicate the lost data. The number of surface failures of the multi-platter disk may then be determined 806 so that it may be determined whether the number of surface failures of the multi-platter disk exceeds a threshold 808. In the event that the number of surface failures of the multi-platter disk exceeds the threshold 808, it may be determined 810 whether any of the data on any of the surfaces of the multi-platter disk that have not failed may be migrated and, if so, that data may be migrated 812 to a different storage location before the entire disk is marked as failed 814. In an embodiment, a set of usable surfaces may be stored such that, as surface failures occur and/or surfaces are marked as failed, the failed surfaces may be removed from the set of usable surfaces.

The threshold 808 may be based on one or more business considerations and/or one or more technical considerations. For example, it may be determined that a multi-platter disk may be likely to completely fail after, for example, three out of ten of the surfaces have failed. In such an example, the threshold 808 may be set at two so that any multi-platter disk with three surface failures should be removed from service (i.e., the entire disk should be marked as failed). In another example, the threshold 808 may be based on a cost-benefit analysis of the multi-platter disk so that, for example, a multi-platter disk with a low service time may be kept in service with up to four surface failures while a multi-platter disk with a higher service time may be marked as failed after only two surface failures.

Figure 9:
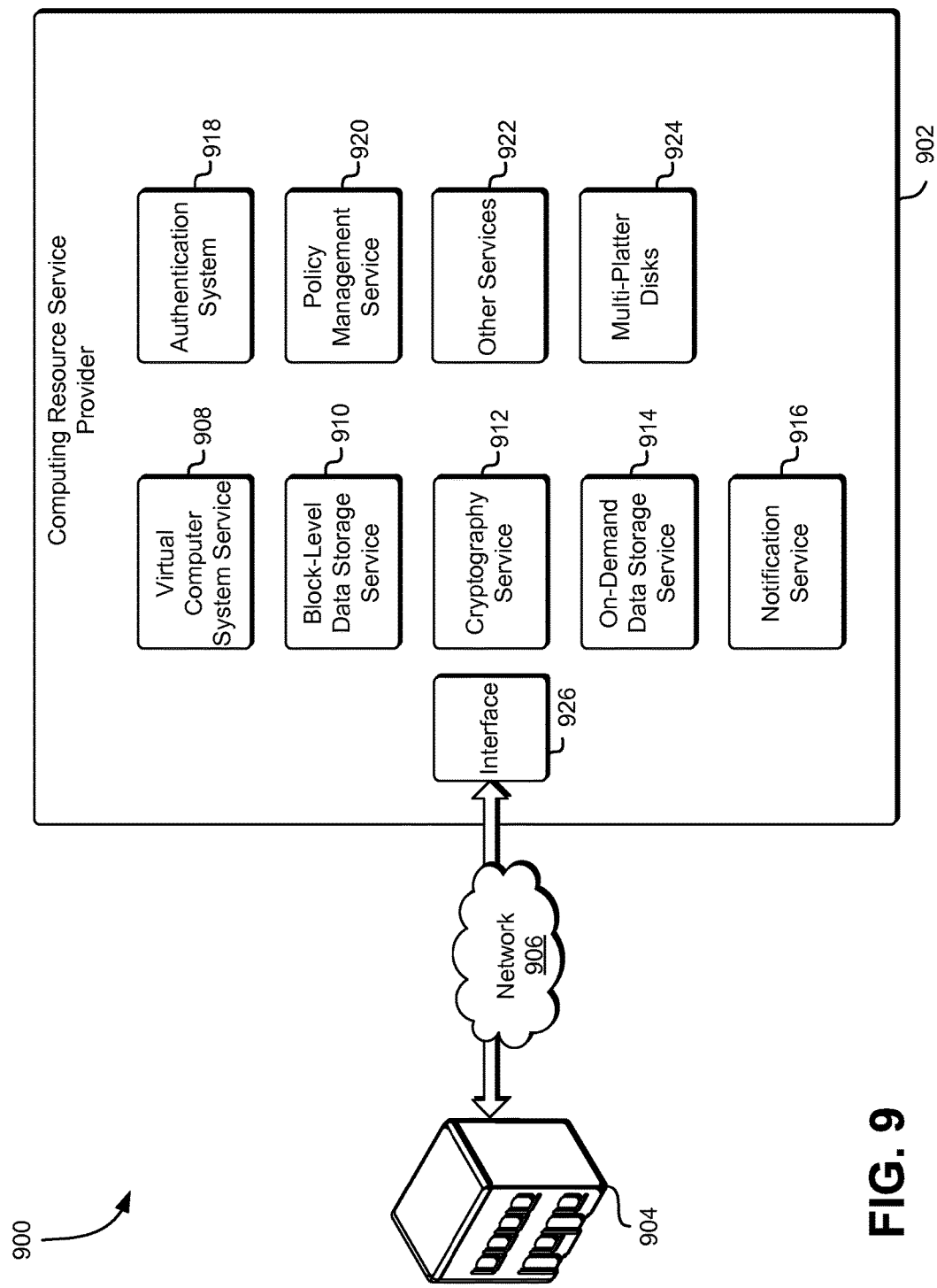
FIG. 9 illustrates an example environment where services may access multi-platter disks where each surface is treated as an independent unit.

FIG. 9 illustrates an example environment 900 where services associated with a computing resource service provider environment may access multi-platter disks where each surface is treated as an independent unit as described in connection with FIG. 1 and in accordance with at least one embodiment. The computing resource service provider 902 may provide a variety of services to the customer 904 and the customer 904 may communicate with the computing resource service provider 902 via an interface 926, which may be a web services interface or any other type of customer interface. While the example environment illustrated in FIG. 9 shows one interface 926 for the services of the computing resource service provider 902, each service may have its own interface and, generally, subsets of the services may have corresponding interfaces in addition to or as an alternative to the interface 926. Each of the services illustrated in FIG. 9 may be an embodiment of and/or may communicate with a storage service such as the storage services 214 described in connection with FIG. 2 which may, in turn, provide access to one or more multi-platter disks 924 where each surface is treated as an independent unit.

The customer 904 may be an organization that may utilize one or more of the services provided by the computing resource service provider 902 to maintain and deliver information to its employees, which may be located in various geographical locations. Additionally, the customer 904 may be an individual that utilizes the services of the computing resource service provider 902 to deliver content to a working group located remotely. As shown in FIG. 9, the customer 904 may communicate with the computing resource service provider 902 using a network 906, wherein the network 906 may be a communication network, such as the Internet, an intranet or an Internet service provider (ISP) network. Some communications from the customer 904 to the computing resource service provider 902 may cause the computing resource service provider 902 to operate in accordance with one or more embodiments described, or a variation thereof.

The computing resource service provider 902 may provide various computing resource services to its customers. The services provided by the computing resource service provider 902, in this example, may include a virtual computer system service 908, a block-level data storage service 910, a cryptography service 912, an on-demand data storage service 914, a notification service 916, an authentication service 918, a policy management service 920, and one or more other services 922. Not all embodiments described may include the services 908 through 922 described with reference to FIG. 9 and additional services may be provided in addition to or as an alternative to services explicitly described. As described, each of the services 908 through 922 may include one or more web service interfaces that enable the customer 904 to submit appropriately configured API calls to the various services through web service requests. In addition, each of the services may include one or more service interfaces that enable the services to access each other (e.g., to enable a virtual computer system of the virtual computer system service 908 to store data in or retrieve data from the on-demand data storage service 914 and/or to access one or more block-level data storage devices provided by the block-level data storage service 910). As described above, each of the services 908 through 922 may access one or more multi-platter disks 924 where each surface is treated as an independent unit.

The virtual computer system service 908 may be a collection of computing resources configured to instantiate virtual machine instances on behalf of the customer 904. The customer 904 may interact with the virtual computer system service 908 (via appropriately configured and authenticated API calls) to provision and operate virtual computer systems that are instantiated on physical computing devices hosted and operated by the computing resource service provider 902. Virtual computer systems may be provided access to data storage which may be provided by one or more surfaces of multi-platter disks 924 where each surface is treated as an independent unit. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 908 is shown in FIG. 9, any other computer system or computer system service may be utilized in the computing resource service provider 902, such as a computer system or computer system service that does not employ virtualization or instantiation and instead provisions computing resources on dedicated or shared computers/servers and/or other physical devices.

The block-level data storage service 910 may comprise one or more computing resources that collectively operate to store data for a customer 904 using block-level storage devices (and/or virtualizations thereof). The block-level storage devices of the block-level data storage service 910 may, for instance, be operationally attached to virtual computer systems provided by the virtual computer system service 908 to serve as logical units (e.g., virtual drives) for the computer systems. The block-level storage devices of the block-level data storage service 910 may be provided by one or more surfaces of multi-platter disks 924 where each surface is treated as an independent unit. A block-level storage device may enable the persistent storage of data used/generated by a corresponding virtual computer system where the virtual computer system service 908 may only provide ephemeral data storage.

The computing resource service provider 902 may also provide a cryptography service 912. The cryptography service 912 may utilize one or more storage services of the computing resource service provider 902 to store keys of the customers in encrypted form, whereby the keys may be usable to decrypt customer 904 keys accessible only to particular devices of the cryptography service 912. The one or more storage services of the computing resource service provider 902 may use one or more of the one or more surfaces of multi-platter disks 924 where each surface is treated as an independent unit.

The computing resource service provider 902 further includes an on-demand data storage service 914. The on-demand data storage service 914 may be a collection of computing resources configured to synchronously process requests to store and/or access data. The on-demand data storage service 914 may also use one or more of the one or more surfaces of multi-platter disks 924 where each surface is treated as an independent unit. The on-demand data storage service 914 may operate using computing resources (e.g., databases) that enable the on-demand data storage service 914 to locate and retrieve data quickly, to allow data to be provided in responses to requests for the data. For example, the on-demand data storage service 914 may maintain stored data in a manner such that, when a request for a data object is retrieved, the data object can be provided (or streaming of the data object can be initiated) in a response to the request. As noted, data stored in the on-demand data storage service 914 may be organized into data objects. The data objects may have arbitrary sizes except, perhaps, for certain constraints on size. Thus, the on-demand data storage service 914 may store numerous data objects of varying sizes. The on-demand data storage service 914 may operate as a key value store that associates data objects with identifiers of the data objects that may be used by the customer 904 to retrieve or perform other operations in connection with the data objects stored by the on-demand data storage service 914.

In the environment illustrated in FIG. 9, a notification service 916 is included. The notification service 916 may comprise a collection of computing resources collectively configured to provide a web service or other interface and a browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 916 may provide notifications to clients using a "push" mechanism without the need to check periodically or "poll" for new information and updates. The notification service 916 may further be used for various purposes such as monitoring applications executing in the virtual computer system service 908, workflow systems, time-sensitive information updates, mobile applications, and many others. The notification service 916 may use one or more of the one or more surfaces of multi-platter disks 924 where each surface is treated as an independent unit to store data associated with the notification service 916.

As illustrated in FIG. 9, the computing resource service provider 902, in various embodiments, includes an authentication service 918 and a policy management service 920. The authentication service 918, in an embodiment, is a computer system (i.e., collection of computing resources) configured to perform operations involved in authentication of users of the customer. For instance, one of the services 908 through 916 and/or 920 through 922 may provide information from a user to the authentication service 918 to receive information in return that indicates whether the user requests are authentic.

The policy management service 920, in an embodiment, is a computer system configured to manage policies on behalf of customers (such as customer 904) of the computing resource service provider 902. The policy management service 920 may include an interface that enables customers to submit requests related to the management of policy. Such requests may, for instance, be requests to add, delete, change, or otherwise modify policy for a customer or for other administrative actions, such as providing an inventory of existing policies and the like. The authentication service 918 and/or the policy management service 920 may use one or more of the one or more surfaces of multi-platter disks 924 where each surface is treated as an independent unit to store data associated with these services.

The computing resource service provider 902 additionally maintains one or more other services 922 based at least in part on the needs of its customers 904. For instance, the computing resource service provider 902 may maintain a database service for its customers 904. A database service may be a collection of computing resources that collectively operate to run one or more databases for one or more customers. The customer 904 may operate and manage a database from the database service by utilizing appropriately configured API calls. This, in turn, may allow a customer 904 to maintain and potentially scale the operations in the database. Other services 922 may include, but may not be limited to, object-level archival data storage services and services that manage and/or monitor other services. Each of these other services 922 may use one or more of the one or more surfaces of multi-platter disks 924 where each surface is treated as an independent unit to store data associated with these other services 922.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 10:
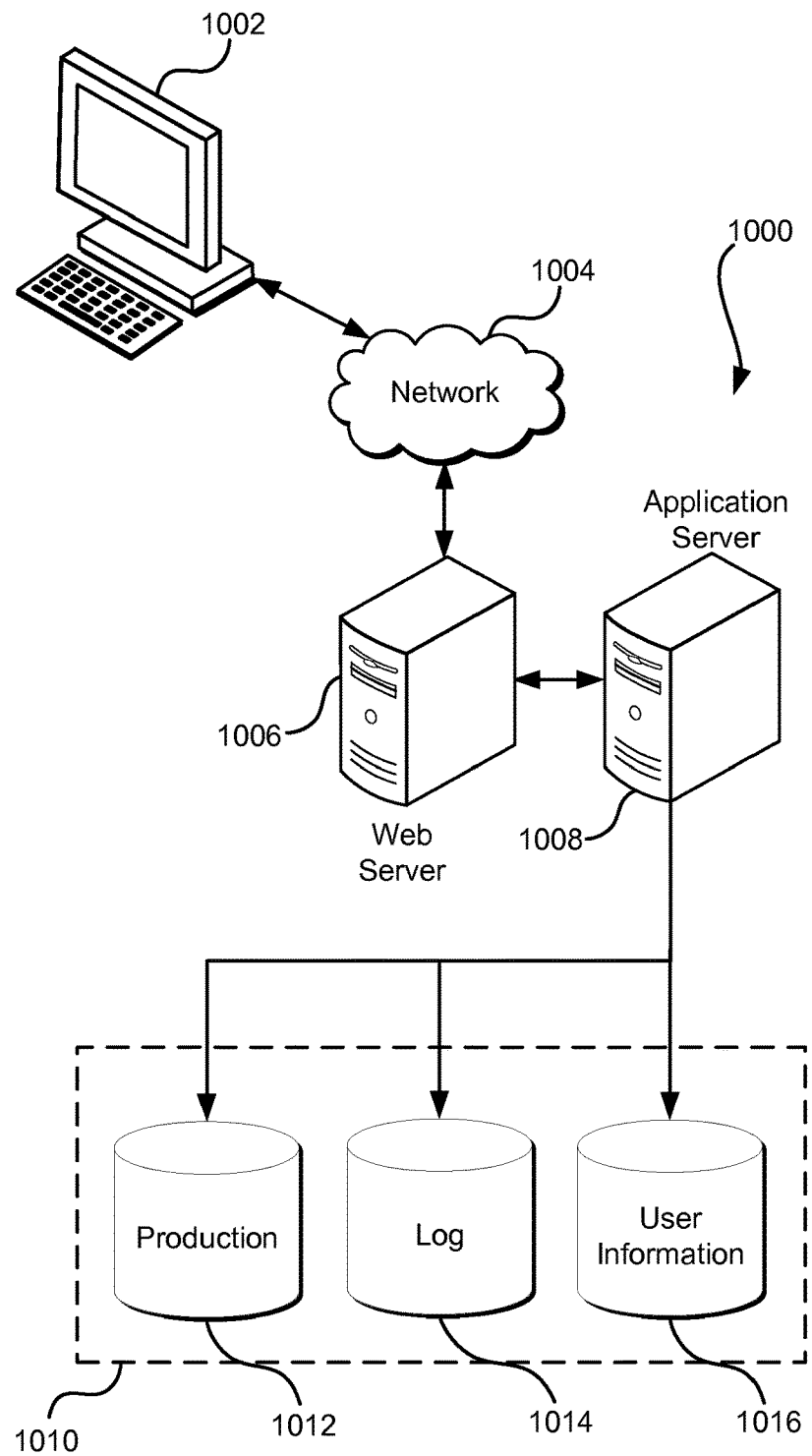
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    determining a set of usable surfaces of a multi-platter disk, each usable surface of the set of usable surfaces configured to store data;
    for each usable surface of the set of usable surfaces:
        receiving a set of corresponding surface layout data that describes an arrangement of a plurality of logical blocks on the usable surface;

calculating a logical unit number, the logical unit number based at least in part on the set of corresponding surface layout data, the logical unit number uniquely associated with the usable surface;

adding the logical unit number to a set of logical unit numbers;

formatting the usable surface based at least in part on the set of corresponding surface layout data; and storing at least a subset of the corresponding surface layout data on the usable surface;

detecting a failed surface of the set of usable surfaces;

removing the failed surface from the set of usable surfaces; and removing the logical unit number corresponding to the failed surface from the set of logical unit numbers.

2. The computer-implemented method of claim 1, further comprising:

determining a number of failed surfaces from the set of usable surfaces;

determining that the number of failed surfaces has exceeded a threshold value; and generating a notification of a failure of the multi-platter disk.

3. The computer-implemented method of claim 1, further comprising:

receiving an input-output request at least specifying one or more logical unit numbers; and causing the input-output request to be fulfilled using the usable surface corresponding to a selected usable surface corresponding to one or more of the one or more logical unit numbers.

4. The computer-implemented method of claim 1, wherein the set of corresponding surface layout data further describes a set of logical block addresses of the plurality of logical blocks.

5. A system, comprising:

one or more processors; and memory including executable instructions that, if executed by the one or more processors, cause the system to at least:

associate each subset of a plurality of subsets of a set of surfaces of a multi-platter disk with a corresponding different logical device address of a set of logical device addresses, each surface of the set of surfaces storing a set of surface layout data that specifies an arrangement of a plurality of logical blocks on the surface;

receive an access request that includes a selected logical device address of the set of logical device addresses that corresponds to a subset of the set of surfaces; and cause the access request to be performed by interacting with a surface of the subset corresponding to the selected logical device address of the access request.

6. The system of claim 5, wherein at least one subset of the plurality of subsets of the set of surfaces contains a single surface of the set of surfaces.

7. The system of claim 5, wherein the system is the multi-platter disk.

8. The system of claim 5, wherein the corresponding different logical device address is a logical unit number of a small computer system interface protocol.

9. The system of claim 5, wherein the system is further configured to implement an on-demand storage service.

10. The system of claim 1, wherein the set of surface layout data further identifies a set of unusable logical blocks associated with the surface.

11. The system of claim 1, wherein the system is further configured to receive the set of surface layout data by requesting access to the set of surface layout data from the multi-platter disk by issuing one or more application programming interface requests to firmware associated with the multi-platter disk.

12. The system of claim 5, wherein each logical device address of the set of logical device addresses permits access to the corresponding subset of the set of surfaces as a corresponding independent hard disk drive.

13. A non-transitory computer-readable storage medium comprising executable instructions that, as a result of execution by one or more processors of a computer system, cause the computer system to at least:

for each subset of a plurality of subsets of a set of surfaces:

store a set of surface layout data on a first set of one or more surfaces of the subset of the plurality of subsets of the set of surfaces, the set of surface layout data describing a storage format that indicates an arrangement of a plurality of logical blocks on the subset of the plurality of subsets of the set of surfaces; and determine a logical device address for the subset of the plurality of subsets of the set of surfaces, the logical device address based at least in part on the surface layout data;

receive an access request that specifies the logical device address; and as a result of the access request specifying the logical device address, use a second set of one or more surfaces of the subset of the plurality of subsets of the set of surfaces to fulfill the access request.

14. The non-transitory computer-readable storage medium of claim 13, wherein the instructions further comprise instructions that, when executed by the one or more processors, cause the computer system to provide a notification of failure of a multi-platter disk after a count of a set of failed surfaces exceeds a threshold value, the threshold value based at least in part on a count of the set of surfaces.

15. The non-transitory computer-readable storage medium of claim 14, wherein the threshold value is further based at least in part on a service time associated with the multi-platter disk.

16. The non-transitory computer-readable storage medium of claim 13, wherein the instructions further comprise instructions that, when executed by the one or more processors, cause the computer system to:

detect a surface failure indicating a failed surface of the set of surfaces; and provide the logical device address for the subset of the plurality of subsets of the set of surfaces that contain the failed surface.

17. The non-transitory computer-readable storage medium of claim 13, wherein the logical device address is at least one of: a first logical unit number, a second logical unit number of a small computer system interface protocol, or a logical device address of a user-specified logical address protocol.

18. The non-transitory computer-readable storage medium of claim 13, wherein the instructions further comprise instructions that, when executed by the one or more processors, cause the computer system to retrieve the set of surface layout data from an operating system of the computer system.

19. The non-transitory computer-readable storage medium of claim 13, wherein the storage format describes one or more unusable blocks on the surfaces in the subset of the plurality of subsets of the set of surfaces.

20. The non-transitory computer-readable storage medium of claim 13, wherein the instructions further comprise instructions that, when executed by the one or more processors, cause the computer system to determine failure of a multi-platter disk as a result of a service time associated with the multi-platter disk exceeding a threshold value.

\* \* \* \* \*